Dec. 28, 1937.   M. A. WECKERLY   2,103,400
WEIGHING DEVICE
Filed Feb. 16, 1934    3 Sheets-Sheet 1
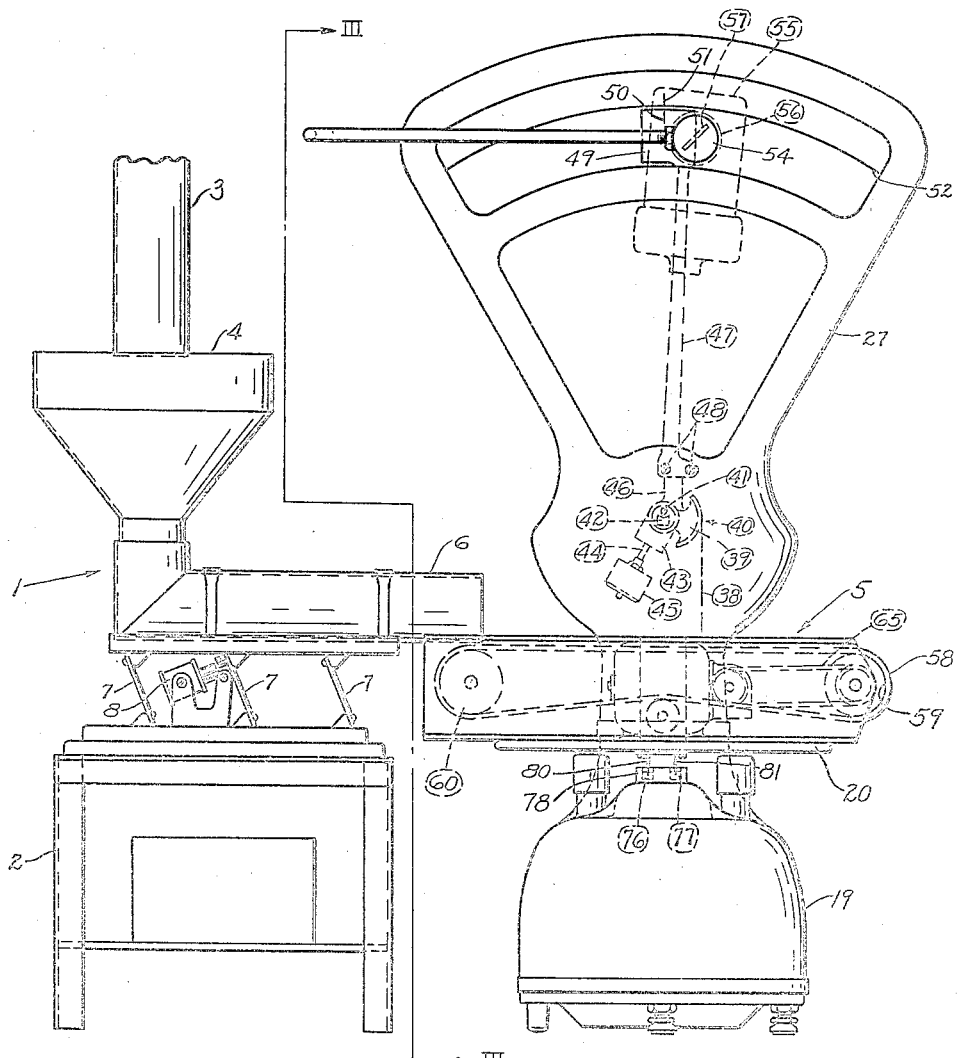
Fig. I
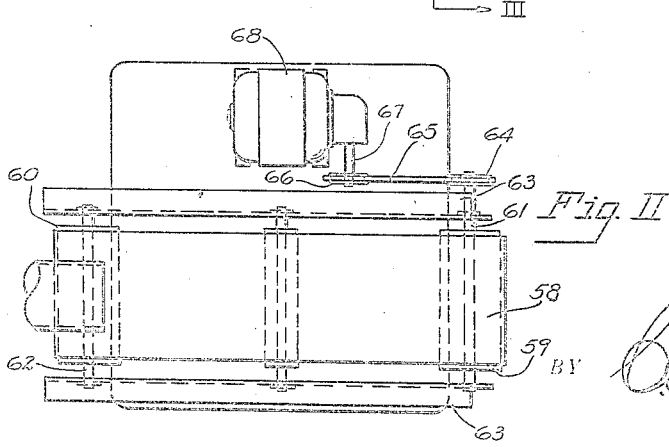
Fig. II
Mark A. Weckerly
INVENTOR
BY
ATTORNEY Dec. 28, 1937.  M. A. WECKERLY  2,103,400
WEIGHING DEVICE
Filed Feb. 16, 1934  3 Sheets-Sheet 2
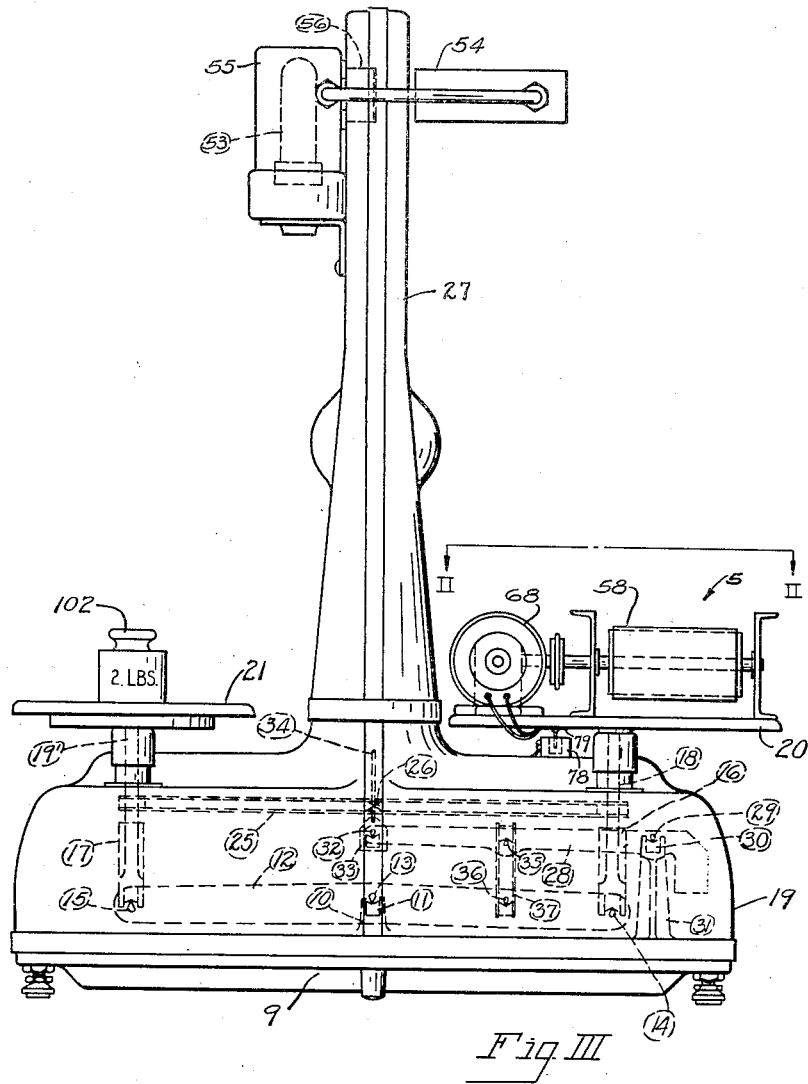
Fig. III
Mark A. Weckerly
INVENTOR
BY C. O. Marshall
ATTORNEY

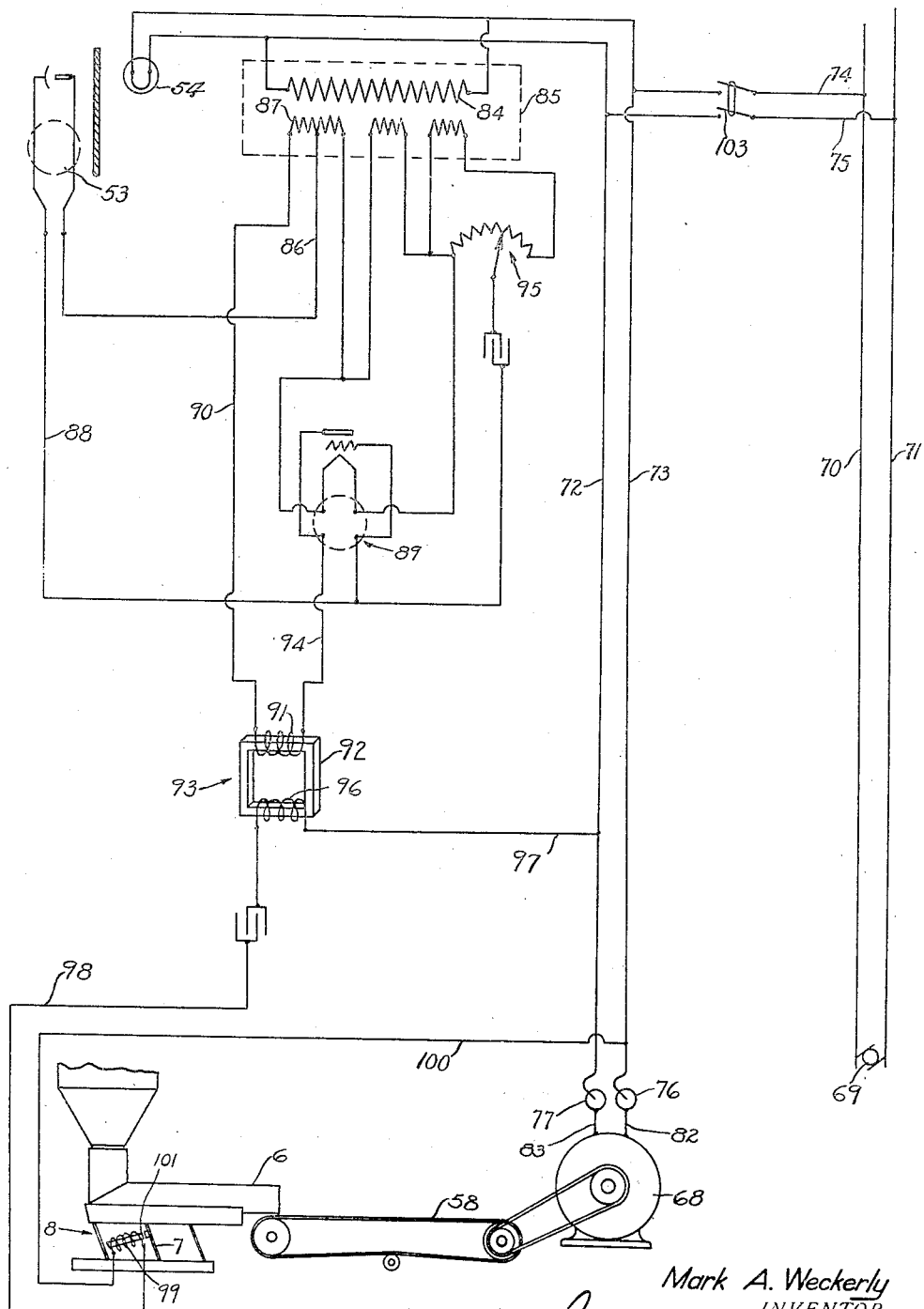
Fig. IV

Patented Dec. 28, 1937

2,103,400

UNITED STATES PATENT OFFICE 2,103,400

WEIGHING DEVICE

Mark A. Weckerly, Toledo, Ohio, assignor to Toledo Scale Manufacturing Company, Toledo, Ohio, a corporation of New Jersey Application February 16, 1934, Serial No. 711,498

5 Claims. (Cl. 249—2)

This invention relates to weighing devices and particularly to devices adapted to continuously weigh predetermined quantities of material within a given unit of time. Such machines find wide application in industry, in continuous batching operations and in continuously delivering accurate amounts of material in blending processes. Therefore, the principal object of my invention is the provision of improved means for accurately feeding a predetermined quantity of material in a given unit of time.

Another object is the provision of improved means, whereby a travelling conveying means is continuously loaded with definite uniform amounts of materials.

Still another object is the provision of improved electrical means non-reactively controlled by a weighing scale for controlling the speed of the material feed stream; and A still further object is the provision of improved means, whereby material feeding means having a predetermined rate of speed are non-reactively mounted on the load receiver of a weighing scale.

Referring to the drawings:

Figure I is a front elevational view of my improved device.

Figure II is a plan view of the load receiver of the scale employed therein showing the relative position of the constant speed conveying means, and as seen substantially from a position along the line II—II of Figure III.

Figure III is a side elevational view of the device seen substantially from a position along the line III—III of Figure I, and Figure IV is a diagram depicting the electrical circuits.

Referring to the drawings in detail, the device comprises a vibratory material feeding means 1 suitably stationed on a stand or other support 2, which is located so that material flowing from a bin (not shown) through a spout 3 and hopper 4 is delivered to a belt conveyor 5. This material feeding means comprises a conduit 6 which is mounted on flexible supports 7, which are located so that impulses from a reciprocating motor 8, are transmitted to the conduit 6, thus imparting a longitudinal vibration thereto, so that any material thereon is advanced with each impulse a distance which is proportional to its amplitude. The motor 8 is of a type in which the amplitude of its reciprocatory motion may be varied as desired. Since such feeding means are known in the art and also described in my copending application Serial No. 641,133 of which this application is to be considered a continuation in part, it is deemed unnecessary to describe its mechanical structure in greater detail.

The weighing device which is used in connection with the feeding means is fully described and disclosed in U. S. Patent 1,768,478 to H. O. Hem, and is, therefore, described herein only so far as is necessary to fully disclose my invention.

In this device a base plate 9 is provided with upstanding extensions 10 in which bearings 11 are seated, a main lever 12 is mounted with its fulcrum pivots 13 upon these bearings 11. Pivots 14 and 15 fixed in the lever 12, in spaced relation to the fulcrum pivots 13, support load and counterpoise receiver spiders 16 and 17 respectively. Posts 18, which are studded into the upper end of the load receiver supporting spider 16 and extend through suitable apertures in a base casing 19 are surmounted by a load receiving platter 20. A pair of posts $19^1$ studded in a similar manner in the counterpoise receiver supporting spider 17 are similarly surmounted by a counterpoise receiver 21. To maintain the condition of level of the spiders 16 and 17 and the receivers mounted thereon, check links 25 pivotally engage these spiders and also a fulcrum pivot 26 fixed in upstanding position midway between the two spiders. This "Roberval" parallelogram is well known in the weighing art, and requires no further description.

Surmounting the base casing 19, which houses the mechanism assembled on the base plate 9, is a housing 27 having a substantially fan-shaped upper portion, in this housing 27 load counterbalancing mechanism, indicating means and load control means are stationed. To transmit the force resulting from the action of gravity on a load receiver 20, an auxiliary lever 28 is mounted with its fulcrum pivot 29 upon bearings 30 which are fixed in the upper end of posts 31 fastened to and extending upwardly from the base plate 9. The opposite end of this lever 28 is provided with a power pivot 32 which engages a suitable bearing in a stirrup 33 suspended from the lower end of a connecting member 34. Pivots 35 and 36 fixed in the auxiliary and main levers 28 and 12 respectively, are connected by a loop 37.

The upper end of the connecting member 34 terminates in a thin flexible metallic ribbon 38 which overlies and is fastened to the upper portion of the arcuate face of a sector 39. This sector forms a part of load counterbalancing pendulum 40, which by means of a fulcrum pivot 41 is mounted upon bearings 42, suitably positioned in the interior of the housing 27. This load counterbalancing pendulum also includes a body portion 43 into which a stem 44 is studded and on which a pendulum weight 45 is threaded. An indicating and controlling member in the form of a "hand" 47 is fastened by means of screws 48 to an upwardly extending portion 46 of the pendulum body 43. The upper end of the hand 47 is in the form of a flag-like paddle 49 having a character 50 marked thereon which is intended to register with a similar character 51, marked on a chart 52 stationed within the housing 27 immediately above and in the plane of the hand 47, when the weight determining portion of this device is in equilibrium.

To control the amplitude of the impulses of the reciprocating motor 8, for reasons which will hereinafter become clear, I employ a photoelectric element 53 and a cooperating light source 54. The photoelectric element 53 is completely enclosed in a casing 55, which is mounted on the back wall of housing 27, so that a cylindrical extension 56 of the casing 55 projects through an aperture in this back wall. The face of this extension 56 is positioned immediately below and slightly back of the plane of the chart and the path of the paddle-like portion of the hand 47. To enable light from the source 54 to impinge upon the light sensitive surface of the element 53, a narrow slot 57 is pierced through the face of the extending portion 56 of casing 55.

The conveyor 5 shown in Figures I and II, comprises an endless belt 58 passing over rollers 59 and 60, mounted on shafts 61 and 62 respectively; these shafts are fulcrumed in channel shaped members 63 positioned transversely on the load receiver 20. To actuate this conveyor a constant speed synchronous electric motor 68 is mounted on the load receiver 20. A belt 65 engaging a pulley 66 secured to shaft 67 of the motor 68 engages a pulley 64 on the roller shaft 61 and rotates the roller 59 mounted thereon. Synchronous motors having a wide range of speeds are obtainable, so that with either inbuilt or external gears and/or suitable belt pulley ratios almost any desired conveyor belt speed may be had.

The weight of this synchronous motor 68 and the conveyor mechanism 5, when mounted on the commodity platter, is counterbalanced when the scale is assembled so that the indicium 50 of the hand 47 is in registry with the indicium 51 marked on the chart 52, when there is neither a load on the belt 58 nor a weight on the counterpoise receiver 21, or when such loads are equal.

The electrical circuits (Figure 4) comprise a source of power 69 and main leads 70—71, other leads 72 and 73 are connected to the first mentioned leads by wires 74 and 75. These leads 72 and 73 terminate in metallic mercury retained in wells 76 and 77 in a dielectric member 78, stationed on the base casing 19 immediately below the load receiver 20. To a dielectric plate 79 fastened to the underside of the load receiver 20 two pins 80 and 81 are dependingly fastened which dip into the mercury in the wells 76 and 77 respectively; thus forming an anti-friction means for conveying current from the stationary base to the relatively movable load receiver 20. Short leads 82 and 83 connected to the pins 80 and 81 conduct the current to the poles of the constant speed synchronous motor 68.

Extensions of leads 72 and 73 are adapted to energize a lamp in the illumination source 54 and the primary winding 84 of a transformer 85. A tap 86 on the secondary winding 87 of the transformer conveys current of the proper potential to the anode of the photoelectric element 53, the cathode of this element is connected by means of a lead 88 to the grid of a thermionic tube 89. A wire 90 attached to one end of coil 91, surrounding one of the legs of a core 92 of a saturable reactor 93, conducts energy thereto from the secondary winding 87, the other end of this coil 91 is connected to the plate of the thermionic tube 89 by means of a wire 94. A potentiometer 95, provided in the circuit permits the necessary adjustment of the grid voltage to be made, for the reasons which are now so well known that no further description is necessary.

The other leg of the core 92 of the saturable reactor is surrounded by a coil 96, one end of which is connected to the power lead 72 by a wire 97; its other end is connected through lead 98 to one end of the stator coil 99 of the reciprocating motor 8, the other end of this coil 99 is connected by a lead 100, to the opposite side of the power line. The armature 101 of the reciprocating motor 8 is fastened to the support 7, which is stationed nearest the coil 99.

In processing operations, for example in blending materials it is necessary that material be furnished at a constant rate of speed per unit of time. The embodiment of my invention herein described is a substantial improvement of the means hereinbefore employed for this purpose. Assuming that for a certain operation 1000 pounds of material are required per hour and that the effective length of the conveyor belt mounted on the platform is 2 feet and also that it travels at the rate of 1000 feet per hour, it is obvious that in order to supply this amount of material in this amount of time each foot of effective length of the belt 58 must constantly feed 1 pound.

In the embodiment of my invention, the means for determining the weight of the material is a scale of the even balance type; the material on the load receiver therefore, must be offset by a poise of equal weight. Since in this example 2 pounds of material must constantly be on the load receiver, a 2 pound counterpoise weight 102 is placed on the counterpoise receiver 21.

*Operation*

The operation of the device is initiated by closing a switch 103 in the leads 74 and 75. This energizes the electric circuit, causing the motor 68 to rotate and revolve the endless belt. Simultaneously, coil 99 of the reciprocating motor is energized and the alternate attraction and repulsion of its armature 101 fastened to the support 7 imparts longitudinal pulsations to the conduit 6.

When the counterpoise 102 is placed on the receiver 21 this weight, resting on one end of the main lever 12 causes the other end of the lever to ascend, this relieves the pull on the pendulum 39 and permits pendulum weight 45, (which when the scale is in equilibrium is partially raised as shown in Figure I) to descend and the hand 47 uncovers the slot 57 entirely, allowing a maximum amount of light to impinge on the photoelectric element. This, in a manner to be hereinafter described in greater detail, causes pulsations of the greatest amplitude to be imparted to conduit 6. The operator now opens a gate, (not shown which may be of any desired construction) in the spout 3, and the material flows through this spout into the hopper 4, and thence into the conduit 6 which due to the pulsation imparted to it delivers the material to the belt 58. The weight of the material delivered on the belt increases the pull on the connecting member 38 of the pendulum 39 through the hereinbefore described lever system and connections, causing the pendulum weight 45 to swing outwardly and upwardly and the paddle 49 on the hand 47 to move in front of the slot 57, thus reducing the illumination on the photoelectric element and decreasing the amplitude of the pulsation of the conduit 6, thereby causing the material to be delivered at a lower rate of speed. This reduction continues until there are 2 pounds of material evenly distributed on the belt, the extension 49 of the indicator 47 has reduced the maximum amount of illumination of the photoelectric element exactly one-half by covering up one-half of the slot 57, and the characters 50 and 51 on the hand and chart respectively are in registry with each other.

When the amount of light impinging on the photoelectric element is diminished the impedance of the element increases, thus reducing the output of the plate of the thermionic tube 89 in the well known manner. The flux in the magnetizing coil 91 which forms a part of the saturable reactor 93 influences the current flowing through the reactance coil 96 which is also a part of the member 93 and in the circuit which energizes the coil 99 of the reciprocating motor, in the well known manner, causing a drop in the potential, which reduces the amplitude of the pulsations imparted to the conduit. As a result the material in the conduit is conveyed at a lower rate of speed. This reduction will continue until the amount of light shining on the photoelectric element is proportional to the amplitude of the pulses, and delivery of the correct amount of material is insured.

Should a partial stoppage occur in the delivery spout 3 or should for any other reason the supply of the material fall below the required amount, as sensed by the weighing device the decrease in the pull on the pendulum 40 will operate to uncover more of the slot 57 and the additional illumination, in the manner hereinbefore described will increase the potential impressed on the coil 99 and increase the amplitude of the pulses imparted to the conduit 6 until the rate of flow is again equal to the desired rate.

Since there are no appreciable time lags in the electric reactions, the corrections are made almost instantaneously, thus insuring an even flow of the correct amount of material to the belt, and since the motor 68 which drives the belt is synchronous and thus has a constant speed, the correct amount of material at the desired rate of speed is assured.

It will be seen that the embodiments of my invention hereinbefore described are well adapted to fulfill the objects primarily stated. It is to be understood, however, that the invention is susceptible to variation, modification and change within the spirit and the scope of the subjoined claims.

Having described my invention, I claim:

1. In a device of the class described, in combination, weighing mechanism, means for supplying material in a smooth stream to said weighing mechanism, a belt conveyor for conveying such material from said weighing mechanism, a synchronous motor for moving said belt conveyor at a uniform linear footage per minute, and means controlled by said weighing mechanism and controlling said supplying means to maintain the load on said weighing mechanism at substantially constant weight, said belt conveyor and synchronous motor being supported on said weighing mechanism.

2. In a device of the class described, in combination, weighing mechanism, a pulsating conveyor for supplying material in a smooth stream to said weighing mechanism, a belt conveyor for conveying such material from said weighing mechanism, a synchronous motor for moving said belt conveyor at a uniform linear footage per minute, and means controlled by said weighing mechanism and controlling said pulsating conveyor to maintain the load on said weighing mechanism at substantially constant weight, said belt conveyor and synchronous motor being supported on said weighing mechanism.

3. In a device of the class described, in combination, weighing mechanism, a pulsating conveyor for supplying material in a smooth stream to said weighing mechanism, a belt conveyor for conveying such material from said weighing mechanism, a synchronous motor for moving said belt conveyor at a uniform linear footage per minute, said belt conveyor and synchronous motor being supported on said weighing mechanism, and photosensitive means controlled by said weighing mechanism and controlling said pulsating conveyor to maintain the load on said weighing mechanism at substantially constant weight.

4. In a device of the class described, in combination, weighing mechanism, electroimpulsive feeding means cooperating therewith, said weighing mechanism comprising load-receiving means, load-counterbalancing mechanism and a hand connected to said load-counterbalancing mechanism, the amplitude of the pulses of said electroimpulsive feeding means being variable, and means controlled by said weighing mechanism for varying such amplitude, said means comprising a photosensitive element, an opaque screen mounted to shield said photosensitive element, there being a slot in said screen adjacent the path of said hand, said slot being substantially angular to the position of one edge of said hand whereby movement of said hand varies the amount of light passing through said slot substantially proportionally to the weight of a load on said load-receiving means.

5. In a device of the class described, in combination, weighing mechanism, a pulsating conveyor for supplying material in a smooth stream to said weighing mechanism, a belt conveyor for conveying such material from said weighing mechanism, means for moving said belt conveyor at a uniform linear footage per minute, said belt conveyor being so supported by said weighing mechanism that said weighing mechanism is uninfluenced by the means for moving said belt conveyor, and means controlled by said weighing mechanism and controlling said pulsating conveyor to maintain the load on said weighing mechanism at substantially constant weight.

MARK A. WECKERLY.